US009297925B1

(12) United States Patent
Riley

(10) Patent No.: US 9,297,925 B1
(45) Date of Patent: Mar. 29, 2016

(54) SMART MODULE FOR COMMUNICATIONS, PROCESSING, AND INTERFACE

(71) Applicant: The United States of America, represented by the Secretary of Commerce, Washington, DC (US)

(72) Inventor: Rodney Eugene Riley, Long Beach, MS (US)

(*) Notice: Subject to any disclaimer, the term of this patent is extended or adjusted under 35 U.S.C. 154(b) by 179 days.

(21) Appl. No.: 14/159,780

(22) Filed: Jan. 21, 2014

Related U.S. Application Data

(63) Continuation of application No. 14/147,676, filed on Jan. 6, 2014, now abandoned.

(60) Provisional application No. 61/921,298, filed on Dec. 27, 2013.

(51) Int. Cl.
*G06F 19/00* (2011.01)
*G01W 1/00* (2006.01)

(52) U.S. Cl.
CPC ...................................... *G01W 1/00* (2013.01)

(58) Field of Classification Search
CPC ....... G07C 5/008; H04L 67/10; B60W 40/09; G01C 21/34
USPC ...................... 702/3, 116, 118, 182–185, 188
See application file for complete search history.

(56) References Cited

U.S. PATENT DOCUMENTS

| 6,536,272 B1 | 3/2003 | Houston |
| 6,859,831 B1* | 2/2005 | Gelvin ................ B60R 25/1004 340/539.19 |
| 8,195,395 B2 | 6/2012 | Teng et al. |
| 2012/0253746 A1 | 10/2012 | Kolar |
| 2013/0093625 A1 | 4/2013 | Smith |

FOREIGN PATENT DOCUMENTS

EP       0260078 A1    9/1986

OTHER PUBLICATIONS

Beam Communications Iridium 9602SBD Modem, http://www.beamcommunications.com/Products/9602SBD.aspx, (c) 2011, downloaded and printed May 7, 2013.
SVP Iridium Drifter, (MetOcean, 21 Thornhill Drive, Dartmouth, Nova Scotia), www.metocean.com, http://www.metocean.com/Upfiles/Products/PDF/iSVP.pdf, no copyright date, downloaded and printed May 7, 2013.

(Continued)

*Primary Examiner* — Edward Raymond

(57) ABSTRACT

The present invention is a unique combination and physical packaging of low power COTS electronics, real-time operating system, and custom firmware that relays data, messages, and GPS position through the Iridium Short Burst Data (SBD) satellite system. It is a data collector, processor, transmitter, location reporting, and data storage device that provides bi-directional satellite communications anywhere in the world. The combination is very low power and economical as compared to other devices. It can be used for many unattended remote data collection and reporting needs. The smart module may be used in measuring and reporting remote marine data for marine weather analysis, forecasts, and warnings.

8 Claims, 5 Drawing Sheets

(56) References Cited

OTHER PUBLICATIONS

Long-Term Autonomous Ocean Remote Sensing Utilizing the Wave Glider (Liquid Robotics, 1329 Moffett Park Drive, Sunnyvale, CA 94089), American Meterological Society, Jan. 8, 2013, Oct. 2-6, 2012 28th session of the Data Buoy Cooperation Panel, Publication Date May 10, 2012.
A Smart Sensor Web for Ocean Observation: Ingrated Acoustics, Satellite Networking, and Predictive Modeling (Applied Physics Laboratory), published in Selected Topics in Applied Earth Observations and Remote Sensing, IEEE Journal of (vol. 3 , Issue: 4) Date of Publication: Dec. 2010 pp. 507-521 ISSN : 1939-1404 INSPEC Accession No. 11693545.
NDBC's Digital Directional Wave Module, (NOAA National Data Buoy Center, 2009) Published in: Oceans 2011, Sep. 19-22, 2011, pp. 1-10 Print ISBN: 978-1-4577-1427-6 INSPEC Accession No. 12458999.
Integrated Sensor Package (Cognitive Environments), (http://cognitiveenvironments.files.wordpress.com/2012/09/dsc_0003-mod1-integrated-environmentalsensor-based-on-arduino-uno.jpg), Aug. 31, 2012.
Iridium Products, (Iridium Eveywhere), http://www.iridium.com/ProductList.aspx?productCategoryID=2&ViewAll=1, downloaded and printed May 7, 2013.
iSphere, Oil and Spill and Current Tracking Buoy, (MetOcean, 21 Thornhill Drive, Dartmouth, Nova Scotia), www.metocean.com, http://www.metocean.com/Upfiles/Products/PDF/iSPHERE.pdf, no copyright date, downloaded and printed May 7, 2013.
9602 Short Burst Data Transceiver, JouBeh Technologies (11 Thornhill Drive, Dartmouth, Nova Scotia) downloaded and printed May 7, 2013.
NAL—Standard Modems, http://www.nalresearch.com/IridiumHardware.html, (c) 1997-2013 NAL Research Corporation, downloaded and printed May 7, 2013.
Ted Scambos, et al., "New Pathfinder Technology for Ice—Ocean System Monitoring", White paper submitted to the Arctic Observing Summit, Vancouver BC, Apr. 30-May 2 2013.
Liquid Robotics Wave Glider (Power Point Presentation), (c) 2010.
Technical Workshop, Application of Iridium Telecommunications to Oceanographic and Polar Research, (University of Washington Applied Physics Laboratory, 2004).
Architecture of a Satellite-Based Sensor Network for Environmental Observation, (Wei Ye), NASA Earth Science Technology Conference (ESTC), Jun. 25, 2008.
InterOcean Systems, Inc, Remote Environmental Monitoring and Data Collection Systems, http://www.interoceansystems.com/systems_main_htm, (c) 2013, Downloaded and Printed May 13, 2013.

\* cited by examiner

SMART MODULE FOR COMMUNICATIONS, PROCESSING, AND INTERFACE

CROSS-REFERENCE TO RELATED APPLICATIONS

The present application is a Continuation of U.S. patent application Ser. No. 14/147,676 filed on Jan. 6, 2014, and incorporated herein by reference; the present application also claims priority from Provisional U.S. Patent Application No. 61/921,298 filed on Dec. 27, 2013, and incorporated herein by reference.

STATEMENT OF GOVERNMENT INTEREST

The research that led to the development of the present invention was sponsored by the National Oceanic and Atmospheric Administration's (NOAA's) National Data Buoy Center (NDBC). NOAA is a part of the U.S. Department of Commerce, a component of the U.S. Federal government. The United States Government has certain rights in the present invention.

FIELD OF THE INVENTION

The present invention relates to a data collection and reporting system, particularly as used with data buoys and the like, for collecting environmental data. In particular, the present invention is directed toward a modular communications device, which may be readily retrofitted to a data buoy, weather station, or the like, in order to add additional data acquisition capabilities or other features, without disturbing existing communications and data logging equipment at the location.

BACKGROUND OF THE INVENTION

In a remote marine environment, a data collection and reporting system may be used to observe environmental conditions for weather warnings, forecasts, research, and the like. Buoys and weather stations are typically used with a system of various components to sense conditions, and record, process, and transmit data to shore-based receivers or other receiving electronics. These systems are usually composed of multiple hardware and software modules interfaced together and contained in one or more enclosures.

When new types of sensors, or processing schemes, are desired, changing the main processing and reporting system can be time-consuming and expensive because of the changes that are made to a complex system, and testing is required to check the changes and verify function of existing systems are not adversely impacted. It also adds risk of failure to the main environmental observation system until a sufficient amount of testing, perhaps months to years, is completed.

Buoy data acquisition systems and other remote data logging systems and networks are known in the art. Some examples of such systems are related technologies are disclosed below.

Houston et al., U.S. Pat. No. 6,536,272, issued Mar. 25, 2003, and incorporated herein by reference, discloses a water monitoring, data collection, and transmission module, which may be mounted to a ship or buoy, to collect data, process the data and then transmit the data by satellite to a remote central database.

Teng et al., U.S. Pat. No. 8,195,395, issued Jun. 5, 2013, and incorporated herein by reference, discloses a system for monitoring, determining and reporting directional spectra of ocean surface waves in near real-time from a moored buoy. This reference, which names an inventor in common with the present application, discloses a Prior Art data buoy sensor and uplink.

Smith, Published U.S. Patent Application No. 2013/0093625, published Apr. 18, 2013, and incorporated herein by reference, discloses adding a separate data system (in this case, a multilateration system for aircraft tracking) to existing data buoys.

Ishii, Published EP Patent Application 0 260 078, published Sep. 10, 1986, and incorporated herein by reference, discloses a data transmission method for ocean acoustic tomography.

Kolar, Published U.S. Patent Application 2012/0253746, published Oct. 4, 2012, and incorporated herein by reference, discloses an autonomous data quality system. The system monitors data from sensors, particularly remote, unattended sensors, to determine whether the sensor data is suspect.

Long-Term Autonomous Ocean Remote Sensing Utilizing the Wave Glider (Liquid Robotics) describes the wave glider product, which may be utilized in the present invention as a possible platform for a smart sensor. Liquid Robotics Wave Glider (2009) is a product brochure disclosing the basic features of the wave-glider autonomous ocean vehicle.

A Smart Sensor Web for Ocean Observation: Integrated Acoustics, Satellite Networking, and Predictive Modeling (Applied Physics Laboratory) describes an overall system, and despite the use of the terms "Smart" and "Integrated" does not really teach an integrated sensor, but rather integration of a number of disparate sensor types.

NDBC's Digital Directional Wave Module, (NOAA National Data Buoy Center, 2009), describes a directional wave measurement system called the Digital Directional Wave Module (DDWM). The present inventor is a co-author of this document. The reference is relevant to the extent it shows (FIG. 1) a sensor and electronics mounted to a common module frame.

Integrated Sensor Package (Cognitive Environments) discloses an integrated sensor and electronics package comprising three stacked circuit boards. The device includes a Digi XBee series 2 radio configured as a router. A simple microprocessor runs a low-overhead task scheduler, Which manages multi-rate data acquisition and communication using the XBee radio module. The entire device is housed in a custom designed laser-cut housing. The device is intended for use in the Sensing and Communicating AIR project at the University College Falmouth (UK) as part of a building management system.

Iridium Products, (Iridium Everywhere) discloses a number of iridium related data logging and communications products. A few of the products, including the SVP Iridium Drifter, the iSphere and the 9602 Modem are deemed relevant to the present invention and are discussed in more detail below.

SVP Iridium Drifter, (MetOcean), describes an integrated drifting data buoy, which provides sensors, a controller, and an Iridium 9601 data transceiver, packaged into a drifting buoy. This reference illustrates how a limited number of sensors and an iridium modem can be put together into a stand-alone buoy.

iSPHERE, Oil and Spill and Current Tracking Buoy, (MetOcean) discloses a sealed sphere for tracking and monitoring oil spill incidents. The sphere includes an Iridium modem and transmitter, GPS tracker, and instrumentation to measure sea surface temperature data. Like the SVP Drifter discussed above, this reference is relevant in that it discloses an entire stand-alone sensor, instrumentation system, GPS receiver, and Iridium modem and antenna, all in one sealed buoy.

Beam Communications Iridium 9602SBD Modem, describes a modem similar to that used in one embodiment of the present invention. This modem is touted as the most compact Iridium modem available, with a built-in 9-32V DC power supply.

JouBeh Technologies discloses a compact 9602SBD Iridium transceiver and describes a modem similar to that used in one embodiment of the present invention. This modem is touted as the most compact Iridium modem available, with an built-in 9-32V DC power supply.

NAL Standard Modems discloses standard Iridium modems.

New Pathfinder Technology for Ice—Ocean System Monitoring (National Snow and Ice Data Center) discloses an instrument package for monitoring glaciers as well as sea ice and the ocean.

Technical Workshop, Application of Iridium Telecommunications to Oceanographic and Polar Research, (University of Washington Applied Physics Laboratory, 2004) discloses a number of applications for Iridium technology in remote sensing applications. Note the Iridium data module with GPS (page 12).

Architecture of a Satellite-Based Sensor Network for Environmental Observation, (Wei Ye) discloses the use of satellite linked remote sensors for environmental measurements.

InterOcean Systems, Inc., Remote Environmental Monitoring and Data Collection Systems discloses a number of buoy products for environmental monitoring. Note the discussion of a "modular design" on page 1, although there does not appear to be any description of the modules themselves.

While the Prior Art discloses a number of integrated data acquisition systems for use in data buoys, weather stations, and the like, a need remains in the art for an inexpensive, reliable, and easy way to add sensors or other features to such data acquisition stations, without disturbing the underlying electronics, systems, and communications systems in the data acquisition station. In addition, a need exists in the art for a standardized packaged smart sensor module, that can be applied singly, or in a configuration of multiple modules, to allow for flexible configuration of remote data acquisition systems.

SUMMARY OF THE INVENTION

The present invention provides a small, very low power, building block type module that may be used to interface new sensors, or conduct testing of new processing schemes without heavy system development, test, and costs typically encountered in modifying the larger more complex system. In addition, the small very low-power device contains core functions of data collection, processing, and communication. Thus, it can be repurposed to other uses, such as backup to other functions (e.g., GPS position reporting and environmental data transmission and control from shore). It contains readily available wireless communication components. Several of these devices may be organized into a wireless sensor and communications network.

The present invention includes a device which measures data signals, receives data streams, records, processes, and communicates data via wireless links, from remote ocean locations to shore based systems or other nearby communication systems. It combines commercially available electronic parts, operating system and enclosure with a custom circuit board and firmware. One uniqueness feature is the combination of Commercial Off-The-Shelf (COTS) components, satellite services, real time operating system and custom firmware to accomplish data acquisition and reporting needs not readily and commercially available or as economical.

The present invention includes a data collector, processor, transmitter, location reporting, and data storage device which provides bi-directional satellite communications anywhere in the world. The combination uses very little power and is economical as compared to other devices. It may be used for many unattended remote data collection and reporting needs. In one embodiment, the present invention may be used to measure and report remote marine data for marine weather analysis, forecasts, and warnings. The device may include wired and/or wireless connections to interface with sensors, a user, or other devices.

The present invention has a number of applications and methods of use. In one embodiment, the device may be attached to a data buoy or other data collection system, to add additional sensor capabilities, without having to disturb existing sensor equipment. Existing data buoys are often designed as a sensor package, and if additional sensors were added to such a package, the entire system would need to be modified and tested to insure that the additional sensors and software does not create conflicts with other sensors. By providing a "stand alone" packaged sensor solution, the present invention may be readily installed in an existing data buoy, with minimal labor and materials costs, and without disturbing existing sensors, data processors, and communications systems.

The present invention has other applications as well, including as a back-up system, which may be readily installed when other systems fail. It may also be used to provide a back up locator if a data buoy fails or is dislodged. In a fail-safe mode, the system of the present invention can upload a GPS location to an IRIDIUM satellite every day for nearly three years, on battery power.

In addition, the device of the present invention may be used in a modular arrangement, where multiple devices may communicate with one another in wired or wireless modes. The device may be used as a Smart End Device, to log data from a sensor or sensors. Another device, communicating wirelessly or in wired mode, with one or more Smart End Devices, may serve as a Smart Coordinator, accumulating data from other Smart End Devices and uploading the packaged data via satellite modem. In order to reduce the number of different module types in the field, the smart modules of the present invention may be provided with similar or identical hardware, and then programmed in the field to act as Smart End Devices (logging data from sensors) and Smart Coordinators (accumulating data from Smart End Devices) and uploading the data via satellite. In this manner, the inventory of different device types is reduced, and redundant capabilities are provided in the field. If one smart module fails in whole or in part, another module may be configured, even remotely, to take over chores of the failed module.

DETAILED DESCRIPTION OF THE INVENTION

The following description and Figures describe the overall features of the smart module of the present invention. More detailed description of the invention may be found in the Appendices of Provisional U.S. Patent Application No. 61/921,298 filed on Dec. 27, 2013, and incorporated herein by reference. Appendix I contains the System Design Description for the Smart module of the present invention, while Appendix II includes the schematic diagrams for the Smart module of the present invention. Appendix III includes the source code for the software operating in the present invention. All three Appendices are incorporated herein by reference. Appendix III is also provided as an Appendix I to the present application.

Figure 1:
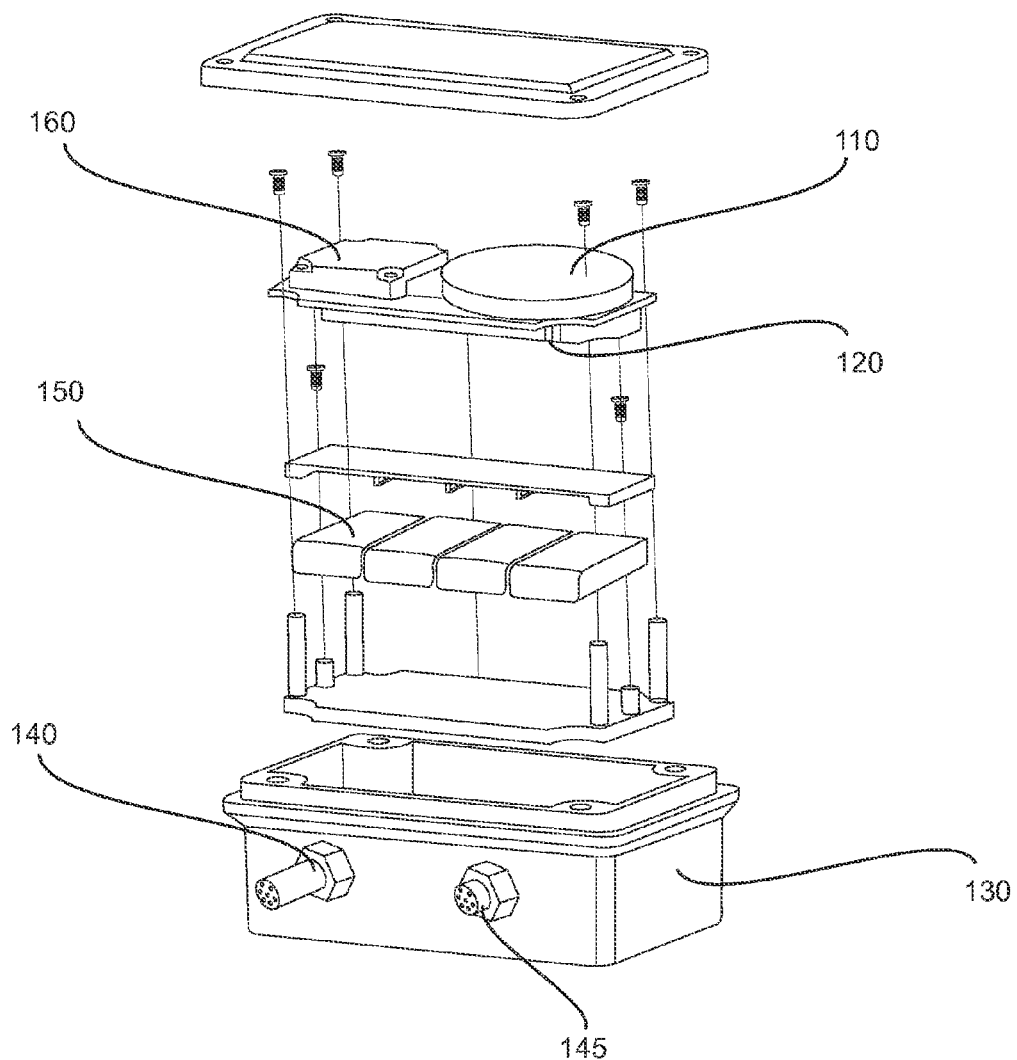
FIG. 1 is an exploded view of one embodiment of the apparatus of the present invention.

FIG. 1 is an exploded view of one embodiment of the apparatus of the present invention. Referring to FIG. 1, the present invention comprises a satellite transceiver 160, circuit board 120 including a GPS receiver, antenna 110, mass data storage device, short range wireless radio, and battery pack 150. Custom circuit board 120 includes a very low power processor, real time operating system, and custom application firmware. The components are enclosed in watertight enclosure 130 with connections 140, 145 for external power and sensors.

Most of the components illustrated in FIG. 1 are commonly available parts, except the custom circuit board 120 and application firmware. The circuit board 120 is what ties the common components together into a system. The application firmware is created by commonly available software development tools. Appendix III includes a copy of the application firmware. The specific function of the application will depend on the intended purpose for the module. Some government applications that have been completed are a converter of analog signals to calibrated digital signals, data logger, asset position reporter, and environmental data message transmitter.

Figure 3A:
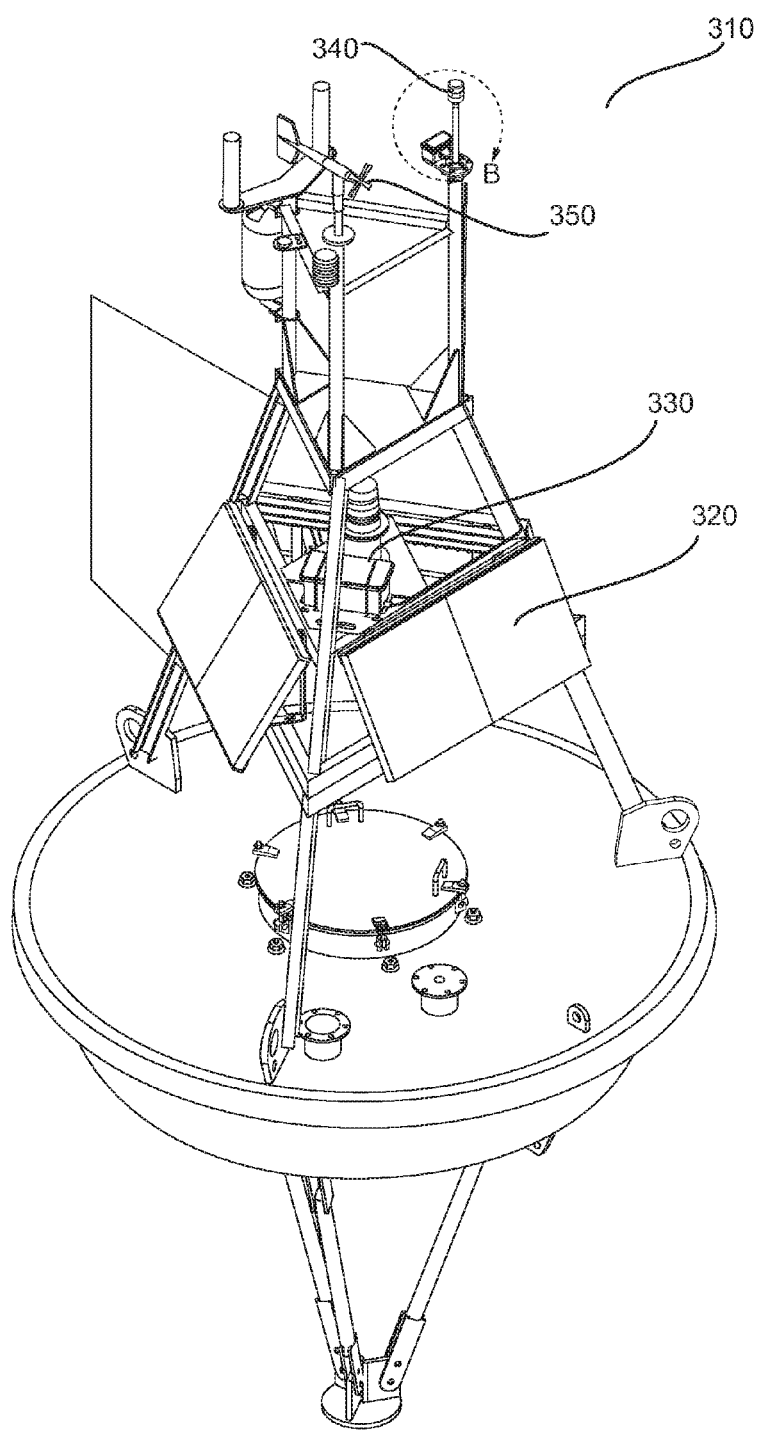
FIG. 3A is a perspective view of the smart sensor module, illustrating installation on an existing weather data buoy.

The device components, including the antenna 110, are enclosed in a NEMA 6P rated enclosure 130 to resist harsh open ocean environments. The device is small and lightweight, which makes it less susceptible to damage from the ocean environment. FIG. 3A is a perspective view of the smart sensor module, illustrating installation on an existing weather data buoy. As illustrated in FIG. 3A, the device of the present invention (in detail B) may be readily mounted to a weather data buoy 310 without disturbing existing sensors 350 or other hardware. Watertight enclosure 130 may be mounted to a buoy mast using fasteners or even wire ties and the like. An external sensor may be connected to the buoy via connections 140, 145, and power supplied via connection 145. Power may be provided from battery pack 330 and/or solar panels 320.

Figure 3B:
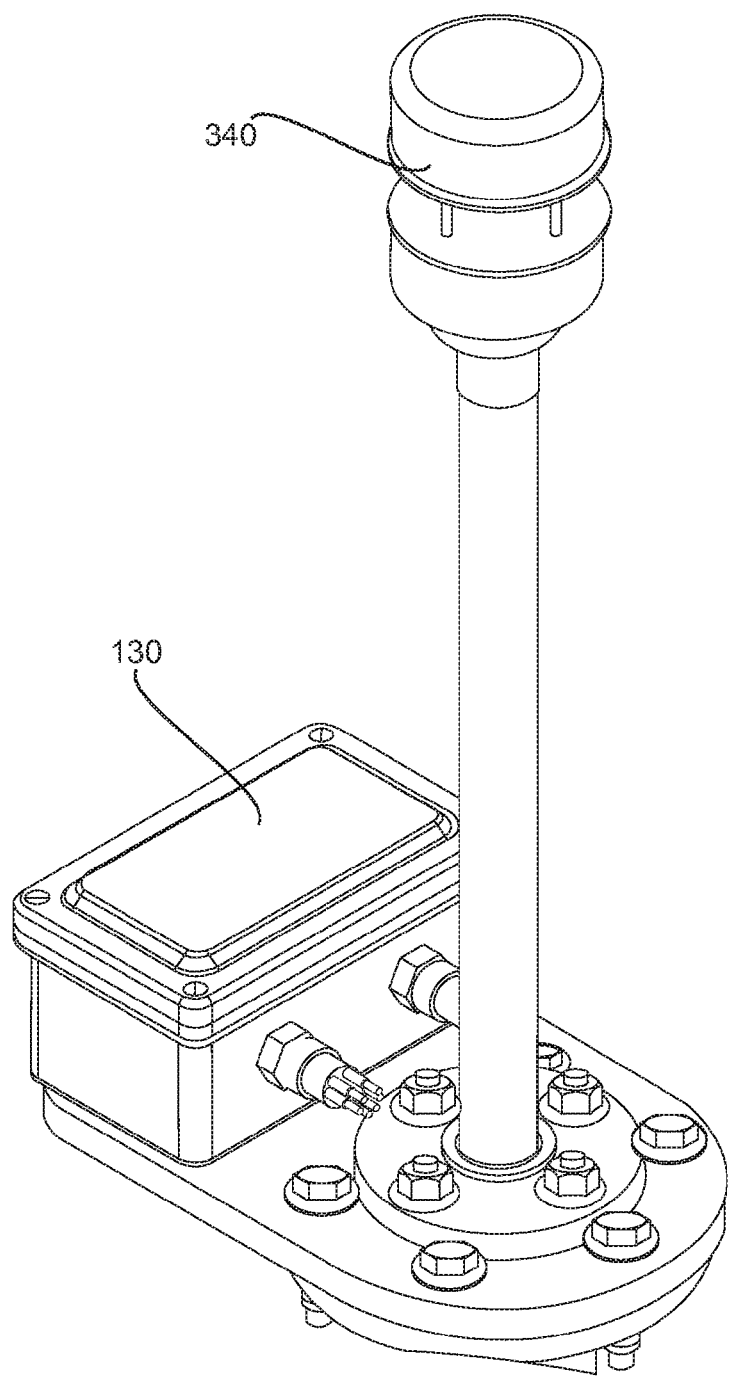
FIG. 3B illustrates the smart module of the present invention as mounted to the data buoy of FIG. 3A.

FIG. 3B illustrates the smart module of the present invention as mounted to the data buoy of FIG. 3A. In this application of the smart module of the present invention, an AIRMAR sensor wind speed sensor 340 manufactured by AIRMAR Technology Corporation of Milford, N.H., is being tested against a standard propeller-type anemometer 350 on Buoy 310. AIRMAR sensor 340 measures wind speed and direction, temperature and barometric pressure. Normally there are two propeller-type anemometers 350 on the buoy 310 (two for redundancy). In this case, one anemometer has been removed and a smart module 130 and AIRMAR sensor 340 combination mounted in that spot. This installation illustrates how a new sensor can be substituted for an existing sensor, or used to augment existing sensors, without disturbing the underlying electronics for the existing sensor system.

The smart module of the present invention may be also used by private companies conducting commercial activities at sea in a similar manner. These may include oil and gas exploration companies. However, a commercial (rather than government) Iridium gateway may have to be used which may add to communications costs.

The present invention provides a small, very low power system building block to use in multiple ways in remote data acquisition and reporting systems. It provides a unique combination of commercially available functions needed to acquire, process, store, and report data economically. It makes testing of new sensors or processing methods, easier and with less risk to operational systems. Thus changes, or additions, to existing more complicated systems can be made faster, more economically, and with less risk to operational systems.

Figure 2:
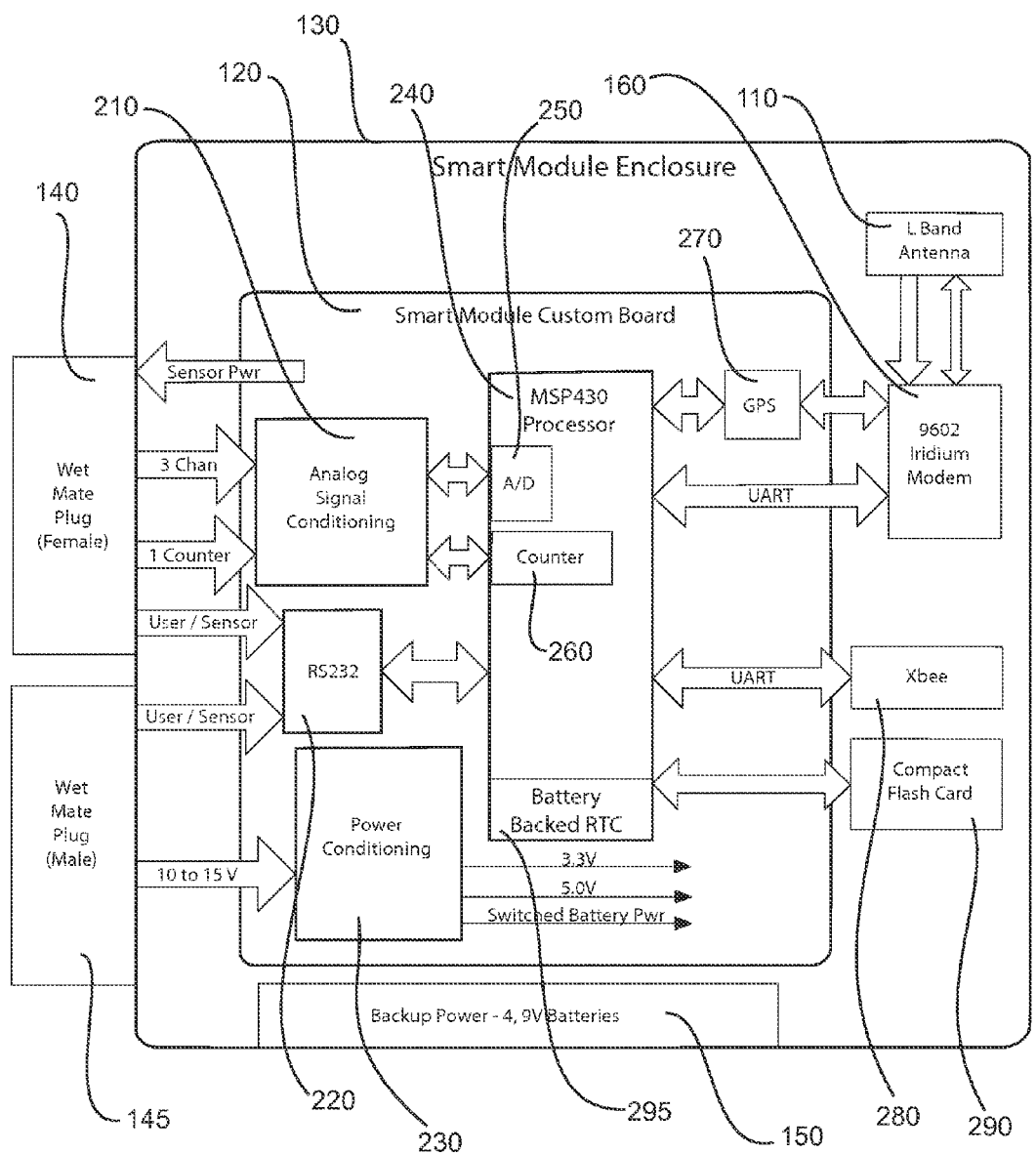
FIG. 2 is a block diagram illustrating the major components in one embodiment of the present invention.

FIG. 2 is a block diagram illustrating the major components in one embodiment of the present invention. Referring to FIG. 2, smart module enclosure 130 includes the smart module custom board 120, which is provided with an MSP430 processor 240, manufactured by Texas Instruments, of Dallas, Tex. Built around a 16-bit CPU, the MSP430 is designed for low cost and, specifically, low power consumption embedded applications. The MSP430 processor 240 may include an onboard A/D converter 250, counter 260, and battery backed real-time clock (RTC) 295.

The smart module of the present invention is provided with advanced calibration firmware, which may be used to calibrate both the smart module of the present invention and the sensor as one unit. Within user menus and under user control, the smart module of the present invention automatically computes a second order calibration and stores the calibration coefficients in non-volatile memory, such as flash card 290. The calibration coefficients are later applied to acquired data. Thus, the smart module of the present invention can increase the accuracy of a sensor. The smart module of the present invention may also have the capability to store data internally.

The software may run a Real-Time Operating System (RTOS) known as Salvo, provided by Pumpkin, Inc., of San Francisco, Calif. The RTOS greatly simplifies coding of the system and eases control of timing. For example, normally code for switching back and forth from high power and low power modes would be sprinkled through the overall code. Also, waking up from low-power mode would have to be done many times. The application becomes complex because of going to low power mode and waking up has to be carefully planned. With Salvo, going into low-power mode and waking up is done in one location in the code. The Salvo scheduler handles all aspects of timing and low-power cycling.

Wet mate plug 140 may be used to interface with various sensors or other smart modules. Inputs from sensors may include three channels of sensor data and one channel of counter data, which may be fed to analog signal conditioning circuit 210, which in turn is tied to the A/D input 250 and counter input 260 in MSP430 processor 240. Power to external sensors may be fed through wet made plug 140 as well. Sensor data or user interface data in serial form may be fed through serial RS232 interface 220, which in turn may transmit data to MSP430 processor 240.

In a wired mode, the smart module of the present invention measures an analog input signal fed through wet mate plug 140, averages the values in analog signal conditioning circuit 210 (or digitally in MSP 430 processor 240), and then formats the data message, and outputs an RS-232 serial data message through an RS232 interface 220, or as output to 9602 Iridium Modem 160. The data message format is compatible with the National Data Buoy Center (NDBC) standard Coastal-Marine Automated Network (C-MAN) message format and does not require formatting by the NDBC payload. The smart module of the present invention can switch power to the sensor via wet mate plug 140 as illustrated in FIG. 2. Some of the details, like how long to measure and average, are configurable through a user interface, which may be wired through wet mate plugs 140 and/or 145 through RS232 interface 220.

The Smart Sensor Module turns a "dumb" analog sensor into a digital, or "smart", sensor. In one embodiment, for example, the system may be configured to provide a measurement of the Rotronics MP101A (available from Rotronic Instrument Corp, Hauppauge, N.Y.) humidity and temperature signals in the same manner as NDBC payloads (e.g. ARES or AMPS).

An additional wet mate plug 145 may be provided to input additional serial sensor or user interface data, as well as provide power to the smart module custom board 120 from, for example, battery bank 330 or solar panels 320 on data buoy 310. Of course, other power sources may be used, depending on system location and installation. Power from commercial power systems (e.g., 110 VAC) may be utilized for a land-based system, through suitable transformers (e.g., wall-pack or the like) with a battery backup provided. Solar panels or even automotive power sources (for mobile devices) may also be applied. In marine environments, other power sources, such as wave-power generated electricity, may be used, without departing from the spirit and scope of the present invention.

Sensor data or user interface data in serial form may be fed through serial RS232 interface 220, which in turn may transmit data to MSP430 processor 240. Power conditioning circuit 230 receives input power from batteries, solar panels, or the like, and filters the power input and outputs appropriate voltages for the various devices in the apparatus, such as 3.3 Volts, 5 Volts, or the like, as well as switched battery power as a backup.

In order to prevent confusion in the field and a possible misconnection of plugs, wet mate plug 140 may be female and wet mate plug 145 may be male. In this manner, a technician installing the device on a data buoy or other difficult environment does not have to remember which plug is which, and the possibility of power being fed into data circuits and vice-versa is eliminated.

Sensor data and other data may be processed in MSP430 processor 240 and then output to 9602 Iridium modem 160 for transmission via L-band antenna 110 to a central processing site, where such data is collected and analyzed as is known in the art. L-band antenna 110 also receives GPS data, which is processed by GPS receiver 270 to provide position data to MSP430 processor 240. Position data may be transmitted as part of an overall data feed in normal use, and/or may be transmitted, as will be described below, as part of a backup emergency locator system, to provide location transmitting capabilities for lost data buoys and the like.

Data may also be output or received through XBee interface 280. XBee is the brand name of a family of form-factor compatible radio modules manufactured by Digi International of Minnetonka, Minnesota. XBee radios are based on the 802.15.4-2003 standard designed for point-to-point and star communications at over-the-air baud rates of 250 Kbit/s. The XBee radios can all be used with the minimum number of four connections—power (3.3 V), ground, data in and data out (UART), with other recommended lines being Reset and Sleep. Additionally, most XBee families have some other flow control, I/O, A/D and indicator lines built in. XBee interface 280 may be used to retrieve data locally, either for programming or testing purposes, or to transmit and receive data to other data collection devices.

As previously illustrated in FIG. 2, the smart module of the present invention includes a single custom printed circuit board 120 with a pluggable XBee Pro, IEEE standard 802.15.4 wireless modem 280. The printed circuit board contains an MSP430 processor 240, sensor power switch 230, RS-232 serial transceiver 220, and gain circuits for analog signal conditioning 210. The A/D 260 resides on the MSP430 chip 240. The smart module of the present invention can switch power to a sensor, read analog signals from the sensor and communicate with a payload or laptop through the RS-232 port 220. The XBee radio 280 provides a short-range connection to other wireless devices and smart modules.

Compact flash card 290 may be provided to store data for later retrieval, and also to store programming for the MSP430 processor 240. Using a compact flash card for programming of MSP430 processor 240 allows the functionality of the device to be changed for different applications, simply by changing flash cards. In the preferred embodiment, all the applications are supplied in the program code. A user may access a configuration mode and then select the desired application (e.g., backup transmitter, smart sensor, etc.)

Figure 4:
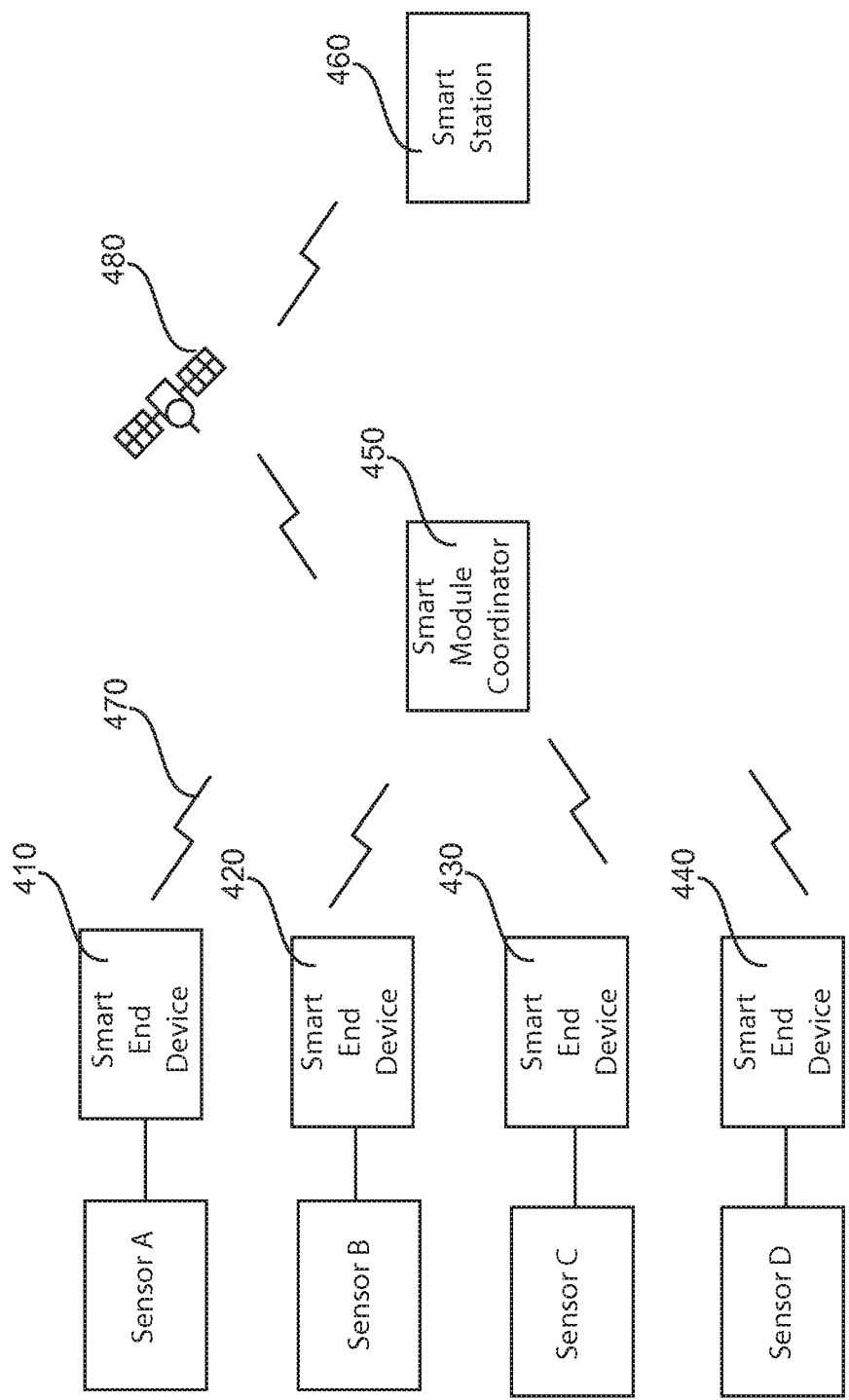
FIG. 4 is a block diagram illustrating how a plurality of Smart Modules may be configured in two-way communication with one another, as Smart End Devices or as a Smart Module Coordinator.

Referring to FIG. 4, in wireless mode, the smart module of the present invention functions the same as the wired mode except that the smart module at the sensor may communicate with another smart module connected to the payload. The smart module at the sensor is called a "Smart End Device" and the smart module at the payload is called a "Smart Coordinator." As illustrated in FIG. 4, a number of Smart End Devices 410, 420, 430, and 440 may be provided, each connected via port 140 to a corresponding sensor or sensors A, B, C, and D. Smart End Devices 410, 420, 430, and 440 may be connected wirelessly 470 using XBee interface 280 of FIG. 2, to another smart module configured as a Smart Module Coordinator 450. All smart modules 410, 420, 430, 440, and 450, whether configured as Smart End Devices or Smart Module Coordinators, may be physically the same or substantially similar. The functionality of each device maybe programmed, either on-site, remotely, or before installation, by altering the programming via compact flash card 290 or by programming through XBee interface 280, RS 232 interface 220, or via 9602 modem 160. Data from Smart Module Coordinator 450 may be sent to Iridium or other type of satellite 480 (or other wireless or wired communications network) to ground station 460, where data may be collected and analyzed. The modular nature of this design allows the use and re-use of interchangeable modules, rather than relying on custom one-off integrated designs, which are difficult to alter in the field.

Referring back to FIG. 4, Smart Module Coordinator 450 may communicate wirelessly to one or more Smart End Devices 410, 420, 430, and 440 to acquire data, and then may send this data to the payload on a serial port or other data pathway. Smart Module Coordinator 450 may be programmed to communicate with several Smart End Devices 410, 420, 430, and 440. In this manner, a number of Smart End Devices 410, 420, 430, 440 may be linked together, and a data buoy or other data station may be upgraded and expanded, without having to reprogram existing sensors A, B, C, and D. The use of linked smart modules allows for a single data channel to be created for multiple modules, limiting the need for multiple modems 160 and antennas 110. Smart sensor modules may be combined in a number of combinations and communicate wirelessly (or in a wired manner) with each other, and the system may be upgraded, altered, reworked, or revamped, in a modular fashion, without having to redesign the underlying data acquisition system—either existing legacy systems or a new smart module-based system.

The use of the Smart Module Coordinator allows data from a number of different sensors A, B, C, and D, to be combined into one data payload and uploaded to satellite 480. Alternatively, each of Smart End Devices 410, 420, 430, and 440 may communicate directly with satellite 480, without the need for Smart Module Coordinator 450. However, such a configuration may run the risk of different Smart End Devices 410, 420, 430, and 440 trying to transmit at the same time, and thus interfering with each other's data signals. In such an event, built-in satellite communications protocols may handle retries of data transmission. Note that the embodiment of FIG. 4 is exemplary only and not limiting in the number and arrangement of configurations. For example, one of Smart End Devices 410, 420, 430, and 440 may be designated as a Smart Module Coordinator—logging data from a sensor and also receiving data from its fellow Smart Modules. If the Smart Module Coordinator fails, another of the Smart End Devices may be programmed to take over the Smart Module Coordinator duties, thus enhancing the robustness of the overall system.

Smart End Devices 410, 420, 430, and 440 may be constructed along the lines of FIG. 2, or may be modified by deleting the 9602 Iridium modem 160 and L-band antenna 110 (a neutered Smart End Device). The Smart End Device may then log data from an attached sensor and then communicate this data in serial form via XBee interface 280 or via wired serial interface through wet plug 145. Smart Coordinator 450 may be provided, in one embodiment, without sensor interface through wet plug 145, and receive data from Smart End Devices 410, 420, 430, and 440 via wired or wireless interface. Smart Coordinator 450 may then package this data and upload it via 9602 Iridium Modem 160 and L-band antenna 110.

However, in the preferred embodiment, all of the smart modules of FIG. 4 may have identical or similar electrical configurations so that they may be programmed and interchanged in the field, thus reducing inventory requirements and reduce costs through economies of scale. Smart modules may be provided with similar or identical hardware, and then programmed in the field to act as Smart End Devices (logging data from sensors) and Smart Coordinators (accumulating data from Smart End Devices) and uploading the data via satellite. In this manner, the inventory of different device types is reduced, and redundant capabilities are provided in the field. If one smart module fails in whole or in part, another module may be configured, even remotely, to take over chores of the failed module, even by remote configuration.

A battery backup in the form of four (4) 9-volt batteries 150 or other battery types (e.g., rechargeable lithium-ion batteries, D-cell batteries, or the like) may be provided within the smart module enclosure 130. This battery backup may be used to provide Compact Position Reporting. In the event of a power failure on a data buoy or other data acquisition device (or other application) the battery backup 150 may be used to power the device, which may then upload the current GPS position from GPS receiver 270, via 9602 Iridium modem 160, so that the device may be tracked. When processor 240 detects a sustained power failure from power conditioning circuit 230, the device may go into Compact Position Reporting mode. In this mode, sensor data logging may be discontinued, and an error or alarm message may be transmitted, periodically, along with GPS position data. The battery backup 150 may be capable of delivering uninterrupted service of up to two years with two reports per day, allowing more than sufficient time for service personnel to locate and service the device.

The present invention provides a stand-alone smart sensor module, which may be implemented to a data buoy or other data-logging device, without the need to reconfigure the data logging device or buoy to add additional sensor capabilities. The present invention provides a compact and easy-to-install module that stands alone from existing data acquisition systems, and thus requires no interface to existing data acquisition systems. It is compact, lightweight, and inexpensive enough, such that each new sensor may be provided with its own smart module, thus eliminating the need to reprogram existing data logging systems when new sensors are added. A number of other applications are also possible.

The Smart Sensor Module may be reused and modified for other purposes, in addition to its use as interface for an analog sensor. It may be used as a wireless coordinator to other Smart Module interfaced devices or used for higher level processing, like the development underway with the aforementioned AIRMAR PB200 all-in-one sensor. Thus the "sensor" part of the name may be dropped to just "Smart Module", or SM. From a building block standpoint, one can modify the firmware to accomplish a different task or processing need. Modifying the firmware is simplified from two standpoints. One, it uses an RTOS which makes timing matters much easier. Second, the application can be very specific and not as complex as the usual NDBC payload. Thus the required programming and testing is much less complex and time consuming.

Referring to FIG. 4, on-demand station data retrieval may be provided in one embodiment of the present invention. With code to interface smart end devices 410, 420, 430, and 440 and a wireless smart module coordinator 450 connected to a payload, a data acquisition operator may request missed transmissions from a payload. Such an embodiment may increase availability and allow for retrieving data reports from storms that were missed onshore. The smart module coordinator may routinely acquire a payload message and store it. Then, upon request from the data center, the smart module coordinator may send back whichever message the data center desired through the Iridium modem. The smart module coordinator may also provide the GPS (time & position) and telemetry. The smart module coordinator with wireless capability may collect messages from any smart module end device and report them back to shore and be controlled by shore operators.

The smart module of the present invention may also be used as a standalone basic weather reporting system, known as the Smart Weather Station (SWS). The smart module may be interfaced with an all-in-one weather sensor (providing basic weather data, such as wind speed, wind direction, temperature, dew point, and the like) and a small power system to make a small, inexpensive, portable basic weather station. Such a weather station may be useful where a service visit to a non-reporting station occurs and discovers severe mast damage that cannot be fixed at sea or at a land location. The standalone weather system may be installed to acquire positioning and some basic level of weather data. Such an all-in-one weather system may be less expensive to deploy, as it is based on the standard smart module, thus reducing inventory costs and taking advantage of lower construction costs through large-scale production.

There has been a long desire to be able to quickly install a small basic weather station package in the field when damaged or inoperative weather buoys are encountered. The smart module of the present invention makes this a real possibility. The smart module may be interfaced with an AIR- MAR PB200 weather instrument, as illustrated in FIG. 3A. The Smart Weather Station provides a compact weather station, which may be installed on a platform to acquire and report base meteorological data in situations where no other weather system is available (e.g., destroyed buoy mast, or inoperative non repairable systems encountered in the field).

The Smart Weather Station (SWS) is constructed as illustrated in FIG. 3B. The AIRMAR PB200 340 and Smart Module 130 are functionally tested and then the two are then integrated, configured (via user port 145), and tested in a blue tag type test to verify readiness. The system is started by simply connecting power. The SWS then enters a "deployment mode" which acquires data for four minutes then transmits a standard NDBC (National Buoy Data Center) formatted message to shore. This cycle is repeated again at a five-minute boundary, five more times. Thus in total, six transmissions are sent at five minutes apart. Depending on the startup time, the first report may not contain data due to the short time to the five-minute boundary. The SWS then exits deployment mode after 30 minutes. Data is then acquired and reported hourly. In "buoy mode" this is minute 42 to 50 followed by an immediate transmission. In C-MAN mode, this is minute 58 to 00, followed by an immediate transmission.

If the battery input voltage falls below 9.5V, the SWS enters a fail-safe mode where data collection and reporting stops. In this mode, it will use its internal 9V battery pack to acquire and report a GPS position once per day. The pack will last three years with one report per day. If system power returns, the SWS will complete the deployment mode again and then acquisition and reporting operation.

Other SWS capabilities include 32 GB of internal storage of raw time series data and engineering level system debug information, back channel (shore to SWS) interface to reconfigure the SWS for longer reporting intervals, or any of its many configuration parameters. One TAO battery canister 330 (two lithium packs) is used to power the SWS for one year when configured for hourly reporting.

The SWS is designed to mount on three-meter and six-meter buoys. FIG. 3A illustrates a 3-meter buoy 310. The SWS (less the battery pack) mounting hole matches the anemometer mount. The battery box 330 installs on the upper mast of a three-meter buoy 310 near the beacon light and matches existing hole-patterns. The SWS 130 and battery box 330 have mounting brackets that can be strapped to any floating structure using stainless steel tie-wraps or u-bolts, or other appropriate means. The exact method used will be determined by the field service team at the particular buoy. In general, the SWS should be installed as high as possible above the buoy deck (like anemometers) and away from metal obstructions over the enclosure lid; or else the Iridium antenna, under the lid, will be blocked and transmissions will fail. The platform condition, sea state, and available ship time may force other options to be used.

The smart module of the present invention may be used as a standalone interface for non-governmental sensors or systems. In some situations, an external customer or agency may desire to install a sensor on a buoy and report data in real time. The Smart Module of the present invention may be used to create a combination to interface private sensors without modifying existing National Weather Service, Climate, or Tsunami warning systems. Alternately, such private data may be passed through a Smart Module Coordinator, and transmitted, along with weather data, to shore.

The smart module of the present invention may be applied to other applications, such as the Wave Glider autonomous self-powered buoy. The wave glider may provide power from onboard systems, and the smart module may fit in the spare area (called the "payload") of the glider. External antenna access may need to be provided, as the "payload" area is behind the glider solar panels, which would likely block RF signals to the Iridium satellite.

The apparatus and methods of the present invention may be applied to other applications, in addition to weather data buoys and the likes. The smart module of the present invention may also be marketed as-is or in a slightly modified configuration as portable weather station for enthusiasts in the general public. For example, a smart weather station module may be configured to communicate data from a remote home weather station to a home computer, smart phone, or other device, via a home wi-fi network Similarly, a network of smart sensors may be installed across farms to better allocate water resources, or in severe weather zones to help monitor tornadic, derecho, and other severe weather activity.

While disclosed in the context of weather data, the apparatus and methods of the present invention may also be applied to security and industrial applications such as biohazard monitoring, motion sensors, security cameras, and other types of data and security sensors, without departing from the spirit and scope of the present invention.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A sensor module for accumulating, processing and transmitting sensor data, comprising:
    a data input for receiving sensor data from at least one instrument, and formatting the sensor data as digital sensor data,
    a processor, coupled to the data input, configured to process and store the digital sensor data in memory, and packaging digital sensor data for transmission to a remote data system; and
    a satellite communication modem, coupled to the processor and the internal antenna, receiving packaged digital sensor data and transmitting the packaged digital sensor data to the remote data system,
    wherein the data input further including one or more of:
        a first analog input configured to receive analog sensor data from at least one external sensor, a signal conditioning circuit receiving the analog sensor data and conditioning the analog sensor data, and an analog-to-digital converter, coupled to the signal conditioning circuit, configured to convert conditioned analog sensor data into digital sensor data, and
        a first digital input configured to receive one or more of digital sensor data from an external sensor and user control data from a user, wherein the processor, coupled to the analog-to-digital converter and the first digital input, is configured to process and store the digital sensor data in memory, and packaging digital sensor data for transmission to a remote data systems;
    wherein a sensor module may be configured through one or more of user control data from the first digital input and memory of the processor, to configure a sensor module in at least one of a plurality of modes,
    wherein in a first mode, where the at least one sensor module is configured as a smart module coordinator, receiving digital sensor data from at least one other sensor module, storing digital sensor data from the at least one other sensor module, packaging digital sensor data from the at least one other sensor module with position data, and transmitting packaged digital sensor data and position data to the remote data system through the satellite communication modem and internal antenna;

wherein in a second mode, where the at least one sensor module is configured as a smart end device, receiving analog sensor data from at the least one sensor, converting the analog sensor data to digital sensor data in the analog-to-digital converter, and transmitting the digital sensor data to another sensor module configured as a smart module coordinator; and wherein in a third mode, the sensor module is configured as a stand-alone smart sensor device, receiving analog sensor data from the at least one sensor, converting the analog sensor data to digital sensor data in the analog-to-digital converter, packaging digital sensor data from the at least one other sensor module with position data, and transmitting packaged digital sensor data and position data to the remote data system through the satellite communication modem and internal antenna.

2. The sensor module of claim 1, further comprising:
a global positioning system receiver, coupled to the processor and an internal antenna, generating position data to the processor, the processor further configured to include package position data with digital sensor data for transmission to the remote data system;
wherein the satellite communication modem, coupled to the processor and the internal antenna, receives packaged digital sensor data and position data and transmits the packaged digital sensor data and position data to the remote data system.

3. A sensor module for accumulating, processing and transmitting sensor data, comprising:
a data input for receiving sensor data from at least one instrument, and formatting the sensor data as digital sensor data,
a processor, coupled to the data input, configured to process and store the digital sensor data in memory, and packaging digital sensor data for transmission to a remote data system; and
a satellite communication modem, coupled to the processor and the internal antenna, receiving packaged digital sensor data and transmitting the packaged digital sensor data to the remote data system,
wherein the data input further including one or more of:
a first analog input configured to receive analog sensor data from at least one external sensor, a signal conditioning circuit receiving the analog sensor data and conditioning the analog sensor data, and an analog-to-digital converter, coupled to the signal conditioning circuit, configured to convert conditioned analog sensor data into digital sensor data, and
a first digital input configured to receive one or more of digital sensor data from an external sensor and user control data from a user, wherein the processor, coupled to the analog-to-digital converter and the first digital input, is configured to process and store the digital sensor data in memory, and packaging digital sensor data for transmission to a remote data system,
the sensor module further comprising a local wireless communications system, coupled to the processor and configured to communication bi-directionally with a plurality of other sensor modules, to receive digital sensor data from other sensor modules and to transmit commands to other sensor modules, wherein a sensor module may be configured through one or more of user control data from the first digital input and memory of the processor, to configure a sensor module in at least one of a plurality of modes, wherein in a first mode the sensor module is configured as a smart module coordinator, receiving digital sensor data from at least one other sensor module, storing digital sensor data from the at least one other sensor module, packaging digital sensor data from the at least one other sensor module with position data, and transmitting packaged digital sensor data and position data to the remote data system through the satellite communication modem and internal antenna, wherein in a second mode, the sensor module is configured as a smart end device, receiving analog sensor data from at the least one sensor, converting the analog sensor data to digital sensor data in the analog-to-digital converter, and transmitting, through the local wireless communications system, the digital sensor data to another sensor module configured as a smart module coordinator; and wherein in a third mode, the sensor module is configured as a stand-alone smart sensor device, receiving analog sensor data from the at least one sensor, converting the analog sensor data to digital sensor data in the analog-to-digital converter, packaging digital sensor data from the at least one other sensor module with position data, and transmitting packaged digital sensor data and position data to the remote data system through the satellite communication modem and internal antenna.

4. A sensor module for accumulating, processing and transmitting sensor data, comprising:
a data input for receiving sensor data from at least one instrument, and formatting the sensor data as digital sensor data,
a processor, coupled to the data input, configured to process and store the digital sensor data in memory, and packaging digital sensor data for transmission to a remote data system; and
a satellite communication modem, coupled to the processor and the internal antenna, receiving packaged digital sensor data and transmitting the packaged digital sensor data to the remote data system,
wherein the data input further including one or more of:
a first analog input configured to receive analog sensor data from at least one external sensor, a signal conditioning circuit receiving the analog sensor data and conditioning the analog sensor data, and an analog-to-digital converter, coupled to the signal conditioning circuit, configured to convert conditioned analog sensor data into digital sensor data, and
a first digital input configured to receive one or more of digital sensor data from an external sensor and user control data from a user, wherein the processor, coupled to the analog-to-digital converter and the first digital input, is configured to process and store the digital sensor data in memory, and packaging digital sensor data for transmission to a remote data system,
the sensor module further comprising a global positioning system receiver, coupled to the processor and an internal antenna, generating position data to the processor, the processor further configured to include package position data with digital sensor data for transmission to the remote data system;
a local wireless communications system, coupled to the processor and configured to communication bi-directionally with a plurality of other sensor modules, to receive digital sensor data from other sensor modules and to transmit commands to other sensor modules, wherein the satellite communication modem, coupled to the processor and the internal antenna, receives packaged digital sensor data and position data and transmits the packaged digital sensor data and position data to the remote data system, wherein a sensor module may be configured through one or more of user control data from the first digital input and memory of the processor, to configure a sensor module in at least one of a plurality of modes, wherein in a first mode the sensor module is configured as a smart module coordinator, receiving digital sensor data from at least one other sensor module, storing digital sensor data from the at least one other sensor module, packaging digital sensor data from the at least one other sensor module with position data, and transmitting packaged digital sensor data and position data to the remote data system through the satellite communication modem and internal antenna, wherein in a second mode, the sensor module is configured as a smart end device, receiving analog sensor data from at the least one sensor, converting the analog sensor data to digital sensor data in the analog-to-digital converter, and transmitting through the local wireless communications system, the digital sensor data to another sensor module configured as a smart module coordinator; and wherein in a third mode, the sensor module is configured as a stand-alone smart sensor device, receiving analog sensor data from the at least one sensor, converting the analog sensor data to digital sensor data in the analog-to-digital converter, packaging digital sensor data from the at least one other sensor module with position data, and transmitting packaged digital sensor data and position data to the remote data system through the satellite communication modem and internal antenna.

5. A sensor system comprising a plurality of sensor modules module for accumulating, processing and transmitting sensor data, arranged in a network, each of the sensor modules comprising a sensor, comprising:

a data input for receiving sensor data from at least one instrument, and formatting the sensor data as digital sensor data;

a processor, coupled to the data input, configured to process and store the digital sensor data in memory, and packaging digital sensor data for transmission to a remote data system; and a satellite communication modem, coupled to the processor and the internal antenna, receiving packaged digital sensor data and transmitting the packaged digital sensor data to the remote data system, wherein the data input of each sensor module further comprises one or more of:

a first analog input configured to receive analog sensor data from at least one external sensor, a signal conditioning circuit receiving the analog sensor data and conditioning the analog sensor data, and an analog-to-digital converter, coupled to the signal conditioning circuit, configured to convert conditioned analog sensor data into digital sensor data, and a first digital input configured to receive one or more of digital sensor data from an external sensor and user control data from a user, wherein the processor, coupled to the analog-to-digital converter and the first digital input, is configured to process and store the digital sensor data in memory, and packaging digital sensor data for transmission to a remote data systems;

wherein at least one sensor module in the sensor system is programmed in a first mode, where the at least one sensor module is configured as a smart module coordinator, receiving digital sensor data from at least one other sensor module, storing digital sensor data from the at least one other sensor module, packaging digital sensor data from the at least one other sensor module with position data, and transmitting packaged digital sensor data and position data to the remote data system through the satellite communication modem and internal antenna;

wherein at least one sensor module in the sensor system is programmed in a second mode, where the at least one sensor module is configured as a smart end device, receiving analog sensor data from at the least one sensor, converting the analog sensor data to digital sensor data in the analog-to-digital converter, and transmitting, through the local wireless communications system, the digital sensor data to another sensor module configured as a smart module coordinator; and wherein at lease one sensor module is configurable in a third mode, as a stand-alone smart sensor device, receiving analog sensor data from the at least one sensor, converting the analog sensor data to digital sensor data in the analog-to-digital converter, packaging digital sensor data from the at least one other sensor module with position data, and transmitting packaged digital sensor data and position data to the remote data system through the satellite communication modem and internal antenna.

6. The sensor system of claim 5, wherein each sensor module further comprises:

a global positioning system receiver, coupled to the processor and an internal antenna, generating position data to the processor, the processor further configured to include package position data with digital sensor data for transmission to the remote data system;

wherein the satellite communication modem, coupled to the processor and the internal antenna, receives packaged digital sensor data and position data and transmits the packaged digital sensor data and position data to the remote data system.

7. The sensor system of claim 5, wherein each sensor module further comprises:

a local wireless communications system, coupled to the processor and configured to communication bi-directionally with a plurality of other sensor modules, to receive digital sensor data from other sensor modules and to transmit commands to other sensor modules, wherein each sensor module in the sensor system may be configured through one or more of user control data from the first digital input and memory of the processor, to configure a sensor module in at least one of a plurality of modes.

8. The sensor system of claim 6, wherein each sensor module further comprises:

a local wireless communications system, coupled to the processor and configured to communication bi-directionally with a plurality of other sensor modules, to receive digital sensor data from other sensor modules and to transmit commands to other sensor modules, wherein each sensor module in the sensor system may be configured through one or more of user control data from the first digital input and memory of the processor, to configure a sensor module in at least one of a plurality of mode.

* * * * *